July 20, 1954  J. E. WHITFIELD  2,683,994
ADJUSTING DEVICE

Filed May 17, 1951  3 Sheets-Sheet 1

INVENTOR.
JOSEPH E. WHITFIELD
BY
Otto Moeller
Attorney

July 20, 1954  J. E. WHITFIELD  2,683,994
ADJUSTING DEVICE
Filed May 17, 1951
3 Sheets-Sheet 2
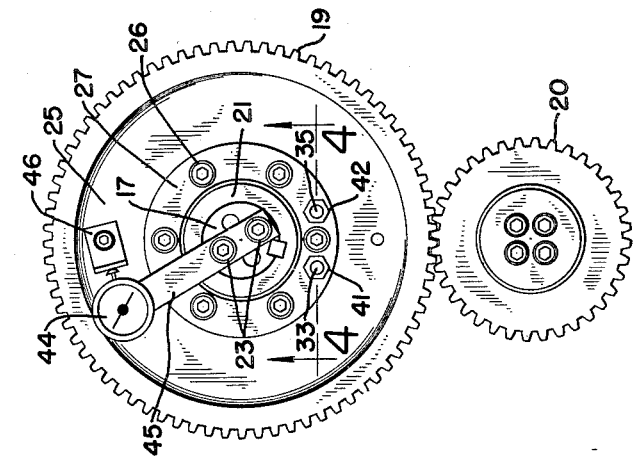
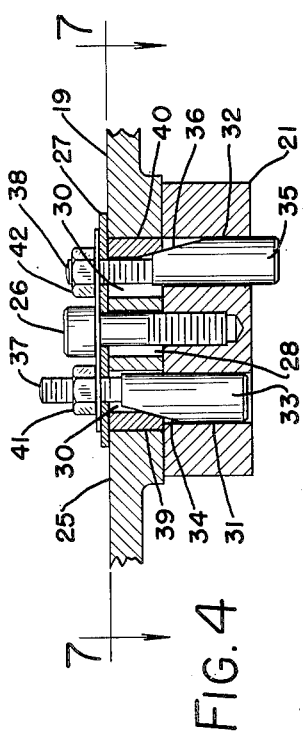
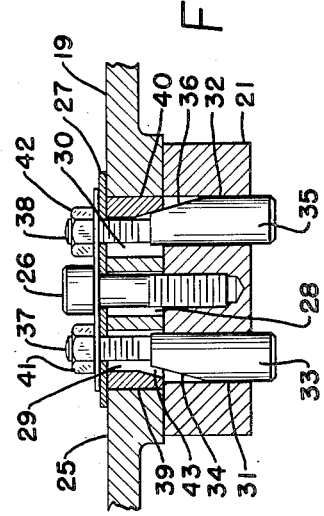
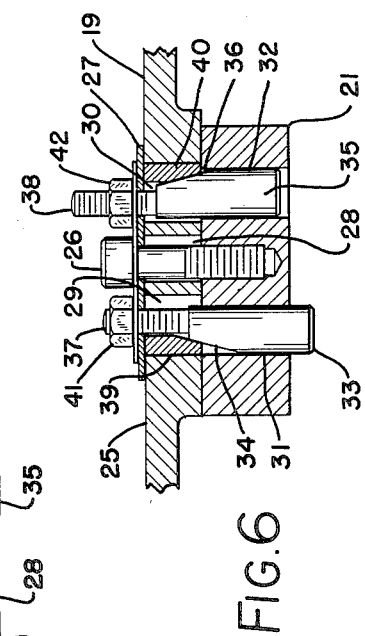
INVENTOR.
JOSEPH E. WHITFIELD
BY
*Otto Moeller*
Attorney July 20, 1954  J. E. WHITFIELD  2,683,994
ADJUSTING DEVICE Filed May 17, 1951  3 Sheets-Sheet 3

INVENTOR.
JOSEPH E. WHITFIELD
BY
Otto Maeller
Attorney

Patented July 20, 1954

2,683,994

UNITED STATES PATENT OFFICE 2,683,994

ADJUSTING DEVICE

Joseph E. Whitfield, Erie, Pa., assignor to Read Standard Corporation, New York, N. Y., a corporation of Delaware Application May 17, 1951, Serial No. 226,864

2 Claims. (Cl. 74—395)

This invention relates to adjusting means and particularly to means for linearly or rotatably moving one member relative to another and locking them in any one of a number of relatively adjusted positions.

An object of the invention is to provide adjusting means permitting of very minute and accurate adjustment and locking in adjusted position of one member with respect to another, as for example, in adjusting the position of a motor on a motor base, where fine adjustments measured in thousandths of an inch are frequently necessary.

The invention is of particular utility in fluid displacement apparatus and apparatus for compressing gaseous media such as blowers, pumps, compressors, motors and meters of the type employing intermeshing rotors. In such devices it is desirable for a number of reasons to provide a slight clearance between the complementary flanks of the rotor threads. Timing gears are therefore employed to maintain the intermeshed threads out of frictional engagement. In this way wear on the rotors is eliminated, thereby prolonging their life; the rotors may be operated at higher speeds providing greater capacity; the necessity for lubricating the rotors is eliminated, which is of particular advantage in that it obviates contamination of the medium being conducted through the apparatus; and generation of excessive heat is avoided. It is therefore an important object of the present invention to provide novel and simple means for timing a pair of intermeshing rotors, and more particularly for conveniently adjusting the intermeshing rotors to obtain a desired clearance therebetween.

Another object of the invention is to provide timing means of the type described including means whereby the rotors are securely locked in any adjusted relative position to maintain them in synchronous timed relation during operation of the rotors.

In blowers, compressors and other apparatus of the type described above, it is desirable to provide a minimum practical clearance between the intermeshed rotors, in order to maintain an effective seal and render negligible leakage of fluid from the discharge end of the apparatus to the inlet end. This clearance is preferably of the order of .006 to .010 of an inch and it is an object of the present invention to provide timing means of extreme sensitivity to accurately adjust and hold the intermeshing rotors to such close clearances.

Other objects and advantages of the invention will become apparent from the following description, taken in conjunction with the accompanying drawings illustrating a preferred embodiment.

In the drawings:

Figure 3 is a view in end elevation of the timing gears of the blower rotors with the invention applied thereto;

Figure 4 is a sectional view taken on the line 4—4 of Figure 3;

Figures 5 and 6 are sectional views similar to the view shown in Figure 4 with parts of the timing means in different positions of adjustment;

Figures 1, 2:
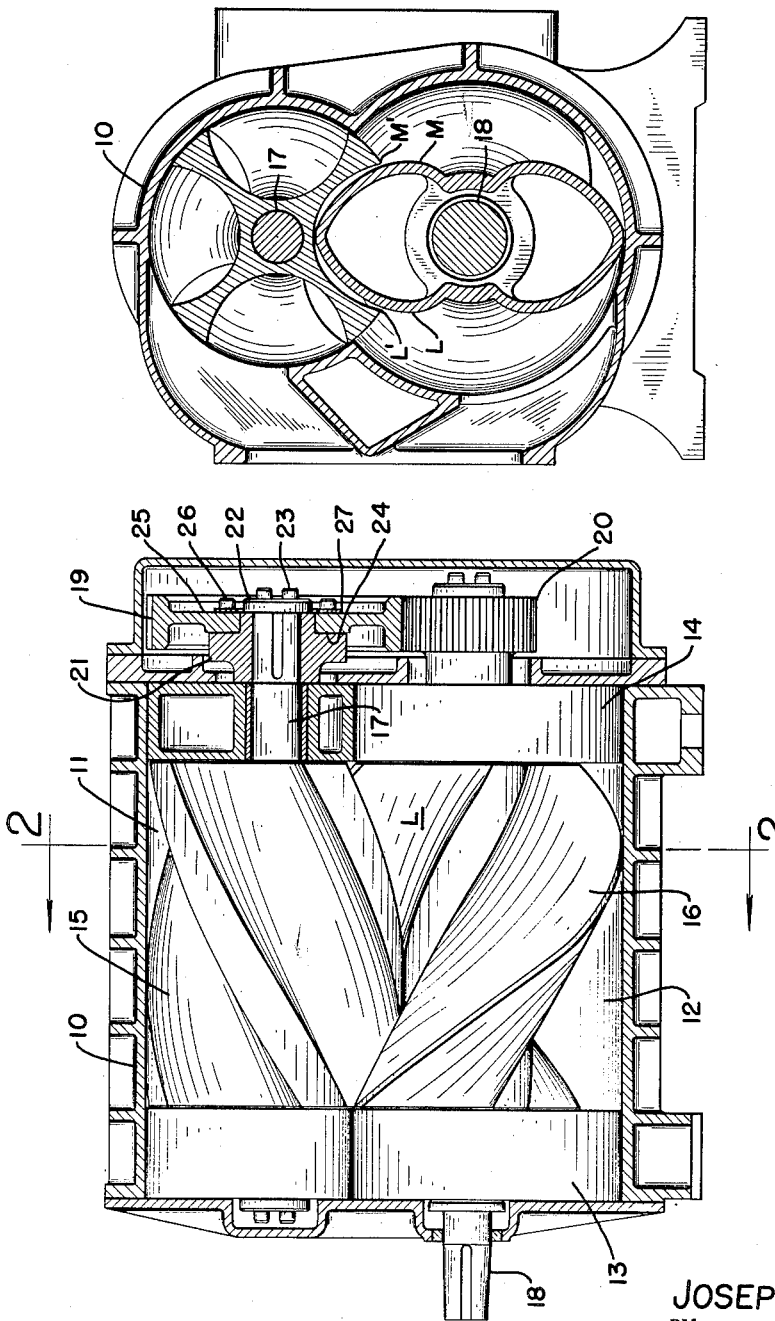
Figure 1 is a sectional view through a blower, parts being shown in elevation, including a pair of intermeshing rotors and timing gears through which the rotors are driven, and which embodies the invention.
Figure 2 is a sectional view taken on the line 2—2 of Figure 1.

Referring now to the drawings, the invention is shown in Figures 1 to 7, for purpose of illustration, as applied to an axial flow fluid device of the type forming the subject matter of my United States Patent No. 2,287,716.

In Figures 1 and 2, the numeral 10 designates the housing of an axial flow fluid device or blower. The housing 10 encloses a pair of parallel cylindrical chambers 11 and 12 which intersect to form a large common chamber, the cross section of which is generally in the form of a figure 8.

Mounted in opposite ends of the housing 10 are heads 13 and 14, which as shown in Figure 1, are preferably made in two parts to simplify the machining operations. A gate or female rotor 15 is disposed in the chamber 11 between the heads 13 and 14 and a meshing main or male rotor 16 is disposed in the chamber 12 between the heads 13 and 14. The rotors 15 and 16 are provided, respectively, with shafts 17 and 18 carried in bearings of any suitable form housed in the heads 13 and 14.

The rotors have complementary intermeshing helical threads, the main rotor 16 having two threads extending through substantially 180° and the gate rotor 15 having four threads extending through substantially 90°, making a ratio of one to two, the curved flanks of the helical threads of the main rotor being described by the continuous crest edges of the helical threads of the gate rotor, and the flanks of the troughs of the gate rotor being described by the continuous crest edges of the main rotor. Referring to Figures 1 and 2, the flank L of the main rotor 16, for example, is described by the crest edge L' of the gate rotor 15 and the flank M of the main rotor 16, for example, is described by the crest edge M' of the gate rotor 15.

The shafts 17 and 18 extend beyond the bearing in the right end head 14, see Figure 1, and have timing gears 19 and 20 secured on the projecting shaft portions. The gear 19 is preferably provided with a separable hub 21 keyed on the projecting portion of the shaft 17. A clamp plate 22 fitting over the outer ends of the hub 21 and shaft 17, is secured to the latter by means of cap screws 23, whereby outward movement of the hub 21 along the shaft 17 is prevented.

At is outer or right hand end as viewed in Figure 1, the hub 21 is provided with an annular recess 24 arranged to receive the gear flange 25. The gear 19 is secured to the hub 21 by means of a plurality of circumferentially arranged equally spaced bolts 26. The bolts 26 extend through an annular clamp ring 27, fitting over the outer ends of the gear flange 25 and hub 21, and project through enlarged openings 28 in the gear flange 25 and are threaded into the hub 21, as best shown in Figures 4, 5 and 6. The diameter of the openings 28 is greater than the diameter of the bolts 26 extending therethrough, so that upon loosening the bolts 26, a small amount of relative rotational movement is provided for between the hub 21, shaft 17 and rotor 15 as a unit and the gear 19, whereby the rotor 15 may be turned with respect to the rotor 16 for purpose of adjusting them to obtain the desired timed relation between them.

As previously stated, it is desirable to maintain a minimum practical clearance between the rotors of fluid devices, such for example, as the rotrs 15 and 16 of the blower illustrated. In other words, since this clearance may be so small as to be measured in thousands of an inch, it is apparent that the proper timing adjustment of the rotors is a very delicate and extremely sensitive operation and the timing means of the present invention makes such adjustment very simple, convenient and accurate. In order to accurately maintain the clearances between the rotors during operation, the invention also provides for locking and holding the rotors in synchronous timed relation. This timing and locking means will now be described in detail.

The portion of the gear flange 25 disposed in the annular recess 24 of the hub 21 is provided with a pair of openings 29 and 30 disposed equidistant from the axis of the gear 19. The openings 29 and 30 communicate with and are preferably somewhat larger in diameter than the respective openings 31 and 32 in the hub 21. The openings 29, 30, 31 and 32 are arranged with their axes parallel with axes of the hub 21 and gear 19.

Disposed in the openings 29, 31, is a pin 33, the inner end of which snugly and slidingly fits in the opening 31 of the hub 21. The outer end of the pin 33, or that portion that extends into the larger opening 29 of the gear flange 25 is provided with an angular facet 34 so that the outer end of the pin 33 is tapered. Similarly, a pin 35 is disposed in the openings 30, 32 and is provided with an angular facet 36. The outer ends of the pins 33 and 35 are provided with threaded stems 37 and 38, respectively, that extend through and project beyond the clamp ring 27.

Disposed in one side of the openings 29 and 30 and arranged for engagement with the facets 34 and 36, respectively, of respective pins 33 and 35, are wedge shaped members 39 and 40. Nuts 41 and 42 are threaded on the stems 37 and 38 to provide for adjustment and locking of the pins 33 and 35 in any position of adjustment.

When, now, it is desired to time the intermeshing rotors 15 and 16, that is; adjust and lock them in position with respect to each other so that for example, equal clearance is provided between the crest edge L' of the gate rotor 15 and the flank L of the main rotor 16 on the one hand, and between the crest edge M' of the gate rotor 15 and the flank M of the main rotor 16 on the other hand; the nut 41 is first backed off slightly along the threaded stem 37. The pin 33 is then tapped inwardly whereby a space is provided between the wedge 39 and facet 34, as shown at 43 in Figure 5. The rotor 15 is then turned, which may be done by drawing up on the nut 42, whereby the hub 21 is turned with respect to the gear 19, until the facet 34 contacts the wedge 39.

This procedure is repeated until the rotors 15 and 16 just touch on one side, for example, until the crest edge L' of gate rotor 15 just touches the flank L of main rotor 16. In Figures 4, 5 and 6 the amount of adjustment is exaggerated in order to better illustrate the invention, but it is apparent that by the means and procedure set forth, very fine and delicate adjustments can be made.

A dial indicator 44 is supported on one end of a bar 45 which is rigidly secured to the end of the rotor shaft 17 by the cap screws 23. Thus when the rotor 15 is turned during the adjusting or timing operation, the dial indicator moves with it. The dial indicator 44 is arranged to engage a block 46 which is secured in any suitable manner to the gear flange 25. Now when, as above described, the rotors 15 and 16 just touch on one side, the dial indicator is set at zero.

After this first operation has been completed, the nut 42 is backed off along the threaded stem 38 and the pin 35 is tapped inwardly to provide a space between the wedge 40 and the facet 36 of pin 35. Now by drawing up on the nut 41, the pin 33 is moved outwardly, and by reason of engagement of the wedge 39 with facet 34, the pin 33 and hub 21 are turned with respect to gear flange 25, and similar rotation is imparted to the rotor 15. This adjusting operation is repeated until the rotors 15 and 16 just touch on the sides opposite the sides that previously touched, for example, until the crest edge M' of gate rotor 15 just touches the flank M of main rotor 16.

A reading is again taken on the dial indicator 44. Now by readjusting the rotors 15 and 16 by the means and procedure above described until the reading on the dial indicator is just half of the previous reading, the clearance between the rotors will be exactly the same, for example, the clearance between crest L' and flank L will be exactly the same as the clearance between crest edge M' and flank M.

It is evident from the above that my invention provides for delicate and accurate adjustment of a pair of intermeshing rotors to properly time them.

While in the form of the invention shown, the one pair of spaced openings 29 and 30 are larger in diameter than the other pair of spaced openings 31 and 32, it is apparent that by tapering one end of the pins the required loose fit can be obtained without making one pair of openings larger than the other pair.

Figure 8:
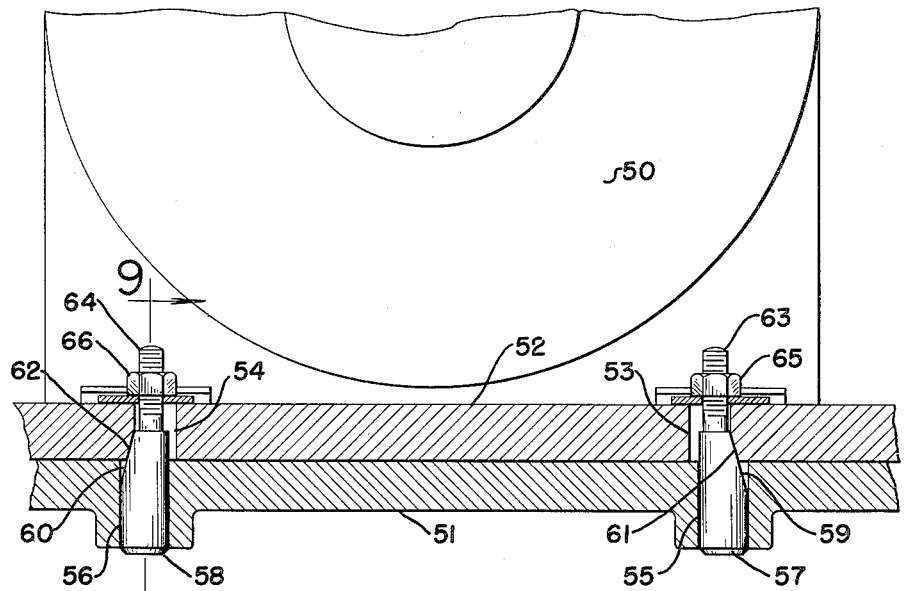
Figure 8 is a sectional view of a modified form of the invention, showing it as applied for adjusting the position of a motor on a supporting base.
Figure 9:
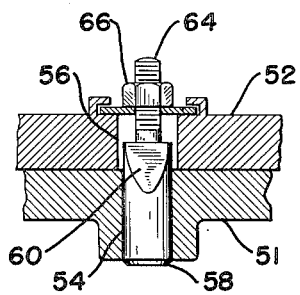
Figure 9 is a sectional view taken on the line 9—9 of Figure 8.
Figure 7:
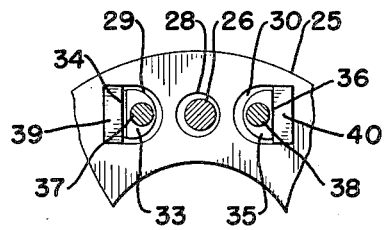
Figure 7 is a sectional view taken on the line 7—7 of Figure 4.

In Figures 8 and 9, the invention with some modifications is shown for adjusting one member, as for example a motor 50, linearly with respect to another member, as for example, a motor support 51.

As in the form of the invention previously described, two relatively movable members are provided with spaced axially communicating openings. In the present instance, the motor base plate 52 is provided with the spaced openings 53 and 54 and the motor support 51 is provided with spaced openings 55 and 56 in axial communication with the openings 53 and 54, respectively. A pin 57 is disposed in the communicating openings 53 and 55, and a pin 58 is disposed in the communicating openings 54 and 56.

One end of each of the pins 57 and 58 is formed to have an axially slidable close fit in the openings 55 and 56 in the motor support 51, while the other ends of the pins 57 and 58 are arranged to have a free or loose fit in the openings 53 and 54 of the motor base plate 52.

The latter ends of the pins 57 and 58 are provided with the oppositely facing wedge shaped facets 59 and 60, respectively. In place of the wedge shaped members 39 and 40 of the first form of the invention, the openings 53 and 54 of the motor base plate 52 are defined on their sides adjacent the wedge shaped facets 59 and 60 of the pins 57 and 58, with the sloping or wedge shaped surfaces 61 and 62 arranged to be engaged by the facets 59 and 60 of the pins 57 and 58.

As in the first form of the invention, the pins 57 and 58 are provided with threaded stem extensions 63 and 64 and the nuts 65 and 66 or other suitable members threaded on the stem extensions are provided for moving the pins 57 and 58 in an axial direction. By adjusting the pins 57 and 58 in the manner explained in the first form of the invention, delicate and accurate adjustments may be made of the motor 50 with respect to the motor support 51.

Figure 10:
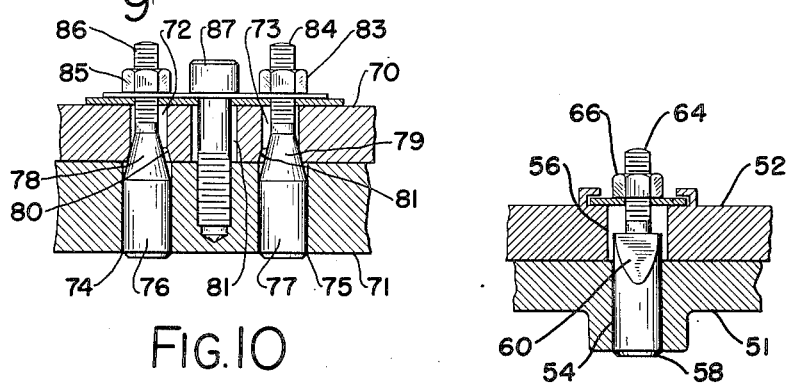
Figure 10 is a sectional view of another modified form of the invention.

In Figure 10 is shown a modification of the construction illustrated in Figures 8 and 9. As before, two relatively movable members 70 and 71 are provided with a pair of spaced axially communicating openings. The member 70 has the spaced openings 72 and 73 and the member 71 the spaced openings 74 and 75 which are in axial communication with the openings 72 and 73, respectively.

A pin 76 is disposed in the communicating openings 72 and 74, and a pin 77 is disposed in the communicating openings 73 and 75. One end of each of the pins 76 and 77 is formed to have an axially slidable close fit in the openings 74 and 75 of the member 71, while the other end of the pins 76 and 77 are tapered, as at 78 and 79, to have a free or loose fit in the openings 72 and 73 of the member 70.

The portions of the member 70 defining the lower end of the openings 72 and 73 are tapered as at 80 and 81 complementary with respect to the tapered portions 78 and 79 of the pins 76 and 77.

Assuming now the member 71 to be stationary or fixed, and it is desired to make an accurate and fine adjustment with respect thereto of the member 70; the bolt 82, which is threaded in the member 71 and has a loose fit in the opening 83 of the member 70, is first loosened. Then, as previously described, the nut 83 is backed off slightly along the threaded stem extension 84 of the pin 77 and the pin 77 is then tapped inwardly to provide clearance between the tapered portion 79 of pin 77 and the tapered portion 81 of the member 70 which are shown in engagement in Figure 10. Now by reason of the engagement, on one side of the tapered portion 78 of pin 76 and the tapered portion 80 of member 70, and the clearance on the opposite side, it will be seen that by drawing up on the nut 85 of the threaded stem extension 86 of the pin 76, the pin 76 is moved outwardly and forces the member 70 to the left as viewed in Figure 10. When the desired adjustment has been made, the nut 83 may be drawn up until the tapered portion 79 again contacts the tapered portion 81 whereby the members 70 and 71 are locked in position, and by tightening bolt 87, the members can be rigidly and securely fastened in adjusted position.

By reversing the procedure, that is, moving the pin 76 inwardly and the pin 77 outwardly, the member 70 can be adjusted in the opposite direction.

I claim:

1. Means for adjusting a movable member with respect to a fixed member, a pair of spaced openings in said movable member, a pair of spaced openings in said fixed member in axial communication respectively with the openings in said movable member, a pin in each pair of communicating openings, one end of each of said pins being formed for axially slidable engagement in the openings of one of said members, the other end of each of said pins extending loosely into the openings of the other of said members, said last named end of each of said pins having a tapered surface and the openings into which they extend being provided with opposed wedges disposed in opposite sides of said last named openings adapted for engagement with the tapered surfaces of said pins whereby axial movement of one of said pins in a direction to engage one pair of cooperating wedges and tapered surfaces effects movement of said movable member in one direction and movement of the other of said pins in a direction to engage the other pair of cooperating wedges and tapered surfaces effects movement of said movable member in the opposite direction.

2. A pair of intermeshing rotors provided with shaft extensions, a hub secured on one of said shaft extensions for rotation therewith, timing gears carried by said hub and the other of said shaft extensions, means for adjusting and locking said rotors in adjusted timed relation, said means including a pair of openings extending in an axial direction through the gear carried by said hub equidistant from the axis of said gear, a pair of openings extending in an axial direction through said hub disposed for axial communication with the pair of openings in said gear, said first named pair of openings having a diameter greater than said second named pair of openings, a pin in each pair of communicating openings, said pins having a slidable fit in said smaller diameter openings of said hub and having a tapered portion extending in said larger diameter openings of said gear, a wedge in one side of each of said larger diameter openings of said gear adapted for engagement with the tapered portion of a respective pin, said pins being movable in an axial direction to bring said tapered pin portions and said wedges into and out of engagement, for moving said hub in one direction or the other with respect to said gear, whereby one of said rotors is moved relative to the other of said rotors.

References Cited in the file of this patent

UNITED STATES PATENTS

| Number | Name | Date |
|---|---|---|
| 395,956 | Day | Jan. 8, 1889 |
| 1,412,317 | Schneider | Apr. 11, 1922 |
| 2,014,932 | Hallett | Sept. 17, 1935 |
| 2,369,539 | Delamere | Feb. 13, 1945 |
| 2,477,004 | Paget | July 26, 1949 |

FOREIGN PATENTS

| Number | Country | Date |
|---|---|---|
| 299,531 | Great Britain | Nov. 1, 1928 |